United States Patent [19]

Vink et al.

[11] 4,311,722

[45] Jan. 19, 1982

[54] HIGH FRUCTOSE HARD CANDY

[75] Inventors: Walter Vink, Purdys Station; Richard W. Deptula, Port Chester, both of N.Y.

[73] Assignee: Life Savers, Inc., New York, N.Y.

[21] Appl. No.: 167,500

[22] Filed: Jul. 11, 1980

[51] Int. Cl.$^3$ ............................................. A23G 3/00
[52] U.S. Cl. .................................. 426/660; 426/658; 426/804
[58] Field of Search ................... 426/660, 658, 804

[56] References Cited

U.S. PATENT DOCUMENTS

| | | | |
|---|---|---|---|
| 3,114,642 | 12/1963 | Meisel | 426/660 |
| 3,271,256 | 9/1966 | Frey | 426/660 |
| 3,556,811 | 1/1971 | Smith | 426/660 |
| 3,826,857 | 7/1974 | Horn | 426/660 |
| 4,153,732 | 5/1979 | Muhler et al. | 426/660 |
| 4,241,092 | 12/1980 | Halik et al. | 426/660 |
| 4,250,202 | 2/1981 | Hartnett | 426/658 |

*Primary Examiner*—Jeanette M. Hunter
*Attorney, Agent, or Firm*—Lawrence S. Levinson; Burton Rodney

[57] ABSTRACT

A hard candy having excellent shelf stability may contain at least 80% by weight fructose, such as in the form of high fructose corn syrup, and optionally, small amounts of dextrin. A method for preparing the above high fructose hard candy is also provided which employs vacuum removal of moisture to avoid degradation and discoloration and impart long shelf-life stability to the hard candy.

9 Claims, No Drawings

HIGH FRUCTOSE HARD CANDY

FIELD OF THE INVENTION

The present invention relates to a hard candy containing large amounts of fructose but yet is a shelf-stable product.

BACKGROUND OF THE INVENTION

Fructose is a desirable sugar in the diet because it is metabolized differently than glucose and is not dependent upon insulin. Fructose, in its native state, has thus been recommended in the diet regimen for diabetics.

Until now, attempts to prepare hard candy glass containing high levels of fructose have resulted in a discolored sticky mass. The fructose employed is extremely labile and easily degrades in the presence of heat. Therefore, fructose content in stable hard candy glasses have been limited to up to 20% fructose (from invert sugar). Accordingly, a hard candy which contains substantially more than 20% fructose but which is not degraded or discolored and has good shelf-life has indeed been a long-felt want.

DESCRIPTION OF THE INVENTION

In accordance with the present invention, a hard candy which contains upwards of 50% or more fructose is provided which has excellent color and shelf-life. In addition to the fructose, which may be used in the form of crystalline fructose or high fructose corn syrup, the hard candy of the invention may optionally contain a small amount of dextrin (derived from starch), as well as inulin (a natural starch-like material composed of fructose molecules) or cellulose gums which have been found to further inhibit degradation of the fructose-containing hard candy glass during manufacture.

As indicated, the hard candy of the invention will contain substantially larger amounts of fructose (for example, up to about 5 times) than that present in heretofore manufactured hard candies. Thus, the hard candy of the invention may contain from about 50 to about 99.5%, and preferably from about 80 to about 98% by weight fructose. The fructose will usually be present in the form of a high fructose corn syrup which may contain from about 40 to about 90% by weight fructose, or as crystalline fructose.

As to the adjunct or optional stabilizers present together with the fructose, the hardy candy of the invention may contain from about 0 to about 20% and preferably from about 1 to about 15% by weight dextrin having a dextrose equivalent of from about 5 to about 20, and preferably from about 5 to about 10. In lieu of or together with dextrin, the hard candy of the invention may contain from about 0 to about 20%, and preferably from about 1 to about 10% by weight inulin and/or from about 0 to about 20% and preferably from about 1 to about 10% by weight cellulose gums.

Examples of cellulose gums which may be present herein include, but are not limited to, microcrystalline cellulose, methyl cellulose, hydroxypropyl cellulose and the like.

In addition, the hardy candy of the invention may include other sweeteners, flavoring, coloring agents, preservatives and the like.

Sweeteners suitable for use herein may comprise natural sugar, in addition to fructose, and/or natural or synthetic sugar substitutes.

Where employed, the synthetic sweeteners may be present in the candy in an amount within the range of from about 0.04 to about 2% and preferably from about 0.4 to about 0.8% by weight of the candy. Examples of synthetic sweeteners suitable for use herein include free saccharin acid, sodium, calcium or ammonium saccharin, cyclamate salts, dihydrochalcones, glycyrrhizic acid and salts, L-aspartyl-L-phenylalanine methyl ester and mixtures thereof.

Where employed, natural sugars and/or natural sugar substitutes may be present in an amount within the range of from about 0 to about 50%, and preferably from about 5 to about 30% by weight of the candy. Such natural sweeteners suitable for use herein include sugar alcohols, such as sorbitol, xylitol, mannitol, or maltitol, as well as monosaccharides of 5 or 6 carbon atoms, such as arabinose, xylose, ribose, glucose, mannose, galactose, dextrose, or sorbose or mixtures of two or more of the foregoing monosaccharides, disaccharides, such as sucrose, cane or beet sugar, lactose, maltose or cellobiose; and polysaccharides, such as, partially hydrolyzed starch, dextrin or corn syrup solids.

The hard candy may also contain as auxiliary sweeteners hydrogenated starch syrups also referred to as hydrogenated starch hydrolysates. Examples of those which may be employed herein include those disclosed in U.S. Pat. No. Re. 26,959 or U.S. Pat. No. 3,556,811 as well as various hydrogenated glucose syrups and/or powders which contain sorbitol, hydrogenated disaccharides, hydrogenated tri- to hexa-saccharides, and hydrogenated higher polysaccharides, or mixtures of any two or more of the above.

The hydrogenated glucose syrups and/or powders may be produced by catalytic hydrogenation of standard glucose syrups (acid and/or enzyme converted) to the point where all the glucose end groups of the saccharides are reduced to alcohols, that is, dextrose end groups to sorbitol end groups. In the case of hydrogenated glucose syrups, the total solids are made of from about 4 to about 30% sorbitol, from about 5 to about 65% hydrogenated disaccharides (that is, maltitol), from about 15 to about 75% tri- or hepta-hydrogenated saccharides, and from about 10 to about 65% hydrogenated saccharides higher than hepta.

Examples of particularly suitable hydrogenated starch hydrolysates include from about 6 to about 10% sorbitol, from about 25 to about 55% hydrogenated disaccharides, from about 20 to about 40% hydrogenated tri- to hepta-saccharides, and from about 15 to about 30% hydrogenated saccharides higher than hepta.

Another example of suitable hydrogenated starch hydrolysates include from about 8 to about 20% sorbitol, from about 5 to about 15% hydrogenated disaccharides, and from about 2 to about 75% hydrogenated tri- to hepta-saccharides.

Particularly preferred are hydrogenated starch hydrolysates of the following compositions.

|  | Parts by Weight | | |
| --- | --- | --- | --- |
|  | 1 | 2 | 3 |
| Sorbitol | 10.5 | 17 | 15 |
| Hydrogenated disaccharides | 7.5 | 13 | 10 |
| Hydrogenated tri- to penta-saccharides | 20 | 70 | 30 |
| Hydrogenated saccharides higher than penta and higher saccharide alcohols |  | 62 | 45 |

-continued

|  | Parts by Weight | | | |
| --- | --- | --- | --- | --- |
|  | 4 | 5 | 6 | 7 |
| Sorbitol | 5–8 | 6–8 | 6–8 | 5–8 |
| Hydrogenated disaccharides | 50–58 | 40–45 | 25–30 | 25–58 |
| Hydrogenated tri- to hexa-saccharides | 20–25 | 25–30 | 35–40 | 20–40 |
| Hydrogenated saccharides higher than hexa | 15–20 | 20–25 | 25–30 | 15–30 |

The hydrogenated starch hydrolysate as described above may be employed as an auxilliary sweetener or substitute for sugar and even sugar alcohols, and may be present in an amount ranging from about 0 to about 20%, and preferably from about 0 to 5% by weight of the hard candy composition.

The hard candy in accordance with the invention may also include flavoring agents in an amount of from about 0.01 to about 10% by weight and preferably from about 0.2 to about 0.25% by weight fruit or mixed fruit flavors.

Preferred sugar containing hard candies in accordance with the present invention may have the following percentage of ingredients

| High fructose corn syrup (40 to 90% fructose) | 85 to 99% |
| --- | --- |
| Dextrin (DE 5 to 15) | 1 to 10% |

Furthermore, in accordance with the present invention, a method is provided for preparing the high fructose hard candy of the invention which includes the steps of admixing fructose (with sufficient water, if the fructose is crystalline, to form a solution) or high fructose corn syrup, with dextrin (where present) or optionally inulin or a cellulose gum, while heating to a temperature of within the range of from about 250° to about 310° F., and preferably from about 265° to about 300° F., and thereafter applying a vacuum of from about 5 to about 30 inches Hg. The resulting fluid is cooled to a plastic state. Thereafter colorings and flavorings are added to form the final product which is extremely dry and unexpectedly non-sticky and shelf-stable.

It will be appreciated that the hard candy of the invention may be produced from 100% crystalline fructose or 100% high fructose corn syrup or varying levels of fructose, dextrin, inulin, cellulose gums and the like as described above. Thus, the crystalline fructose or high fructose corn syrup may be employed to provide a weight ratio of fructose:dextrin (or inulin or cellulose gum) of within the range of from about 25:1 to about 99:1, and preferably from about 40:1 to about 98:1.

The following Examples represent preferred embodiments of the present invention.

EXAMPLE 1

A sucrose-free wild cherry flavored hard candy having the following composition is prepared as described below.

| Ingredient | Amount (parts by weight) |
| --- | --- |
| Crystalline fructose | 9500 |
| Dextrin (DE10) | 500 |

The fructose is dissolved in a solution containing the 10 DE dextrin dissolved in 3000 g of water. The resulting solution is cooked atmospherically to 290° F. and placed under a vacuum of 27" hg for 7 minutes to remove moisture.

The resulting fluid is cooled to a plastic state whence color and flavors are added. The final product is extremely dry and unexpectedly non-sticky and shelf-stable.

EXAMPLE 2

A sucrose-free grape flavored hard candy having the following composition is prepared as described below.

| Ingredient | Amount (parts by weight) |
| --- | --- |
| High fructose corn syrup (90% fructose) | 95 |
| Dextrin (DE10) | 5 |

The high fructose corn syrup is mixed with the dextrin and the resulting solution heated to 290° F. A vacuum of 24" Hg is applied to the mix for 10 minutes to remove moisture.

The resulting fluid is cooled to a plastic state, and color and flavor are added. The final product is dry and unexpectedly non-sticky and shelf-stable.

What is claimed is:

1. A substantially gas-free high fructose hard candy consisting essentially of from about 80 to about 98% fructose which candy is dry and shelf-stable, and further including from about 1 to about 20% by weight dextrin, inulin, a cellulose gum or mixtures thereof.

2. The candy as defined in claim 1 wherein dextrin is present in an amount within the range of from about 1 to about 20% by weight of the candy.

3. The candy as defined in claim 1 containing fructose as the only sugar.

4. The candy as defined in claim 1 containing a sugar in addition to said fructose.

5. A method for preparing the hard candy as defined in claim 1 which comprises forming an aqueous solution of fructose and dextrin, inulin or cellulose gum, heating the solution to from about 260° to about 300° F., applying a vacuum of from about 5 to about 30 inches Hg, to remove moisture, and cooling to form the hard candy.

6. The method as defined in claim 5 wherein the initial fructose is crystalline fructose.

7. The method as defined in claim 5 wherein the initial fructose is high fructose corn syrup.

8. The method as defined in claim 6 wherein an aqueous solution of dextrin is mixed with crystalline fructose to form said solution.

9. The method as defined in claim 7 wherein high fructose corn syrup is mixed with dextrin to form said solution.

* * * * *